United States Patent

[11] 3,617,608

[72] Inventor Walter S. Wisniewski
    Cheltenham, Pa.
[21] Appl. No. 28,846
[22] Filed Apr. 15, 1970
[45] Patented Nov. 2, 1971
[73] Assignee Repco Products Corporation
    Philadelphia, Pa.

[54] UNDERGROUND ELECTRICAL CONDUCTOR HOUSING FOR ACCOMMODATING A TRANSFORMER
7 Claims, 5 Drawing Figs.

[52] U.S. Cl. ..................................... 174/37,
    174/16 R, 174/52 R
[51] Int. Cl. ..................................... H02g 9/02
[50] Field of Search ........................... 174/15 R,
    16 R, 37, 38, 50, 52 R; 336/59, 90, 92

[56] References Cited
UNITED STATES PATENTS
2,100,721  11/1937  Parsons .................... 174/37 X
3,482,030  12/1969  Wisniewski ................ 174/37

FOREIGN PATENTS
736,813  9/1955  Great Britain ................ 174/37

OTHER REFERENCES
Electrical World, Burndy Co. Advertisement, Vol. 166, No. 8, Aug. 22, 1966, pg. 88.
Smalling, Electrical World, "URD Gains Momentum in Long Island," Vol. 166, No. 12, Sept. 19, 1966, pp. 169 and 172.

Primary Examiner—Laramie E. Askin
Attorney—Zachary T. Wobensmith, II

ABSTRACT: A flush-mounted receptacle is provided for electrical connections for use in the ground and for accommodation of a transformer with a protective mounting for the transformer for preventing access of internal condensation and for dissipation of heat released by the transformer.

PATENTED NOV 2 1971 3,617,608

*INVENTOR.*
WALTER S. WISNIEWSKI
BY
*[signature]*
ATTORNEY

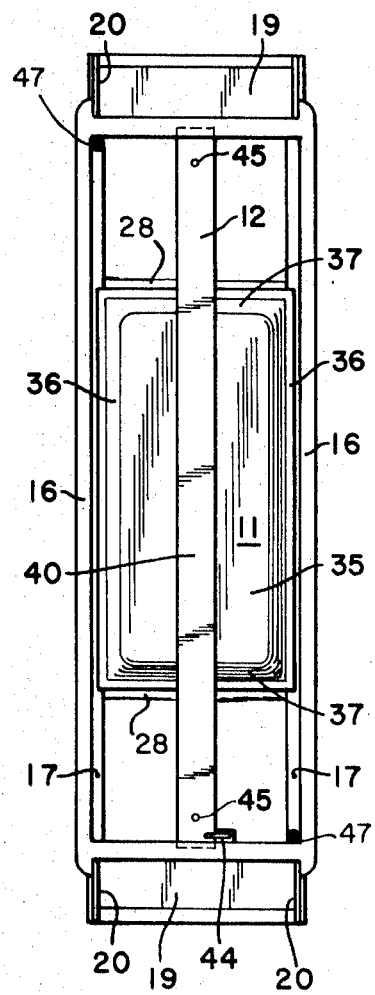
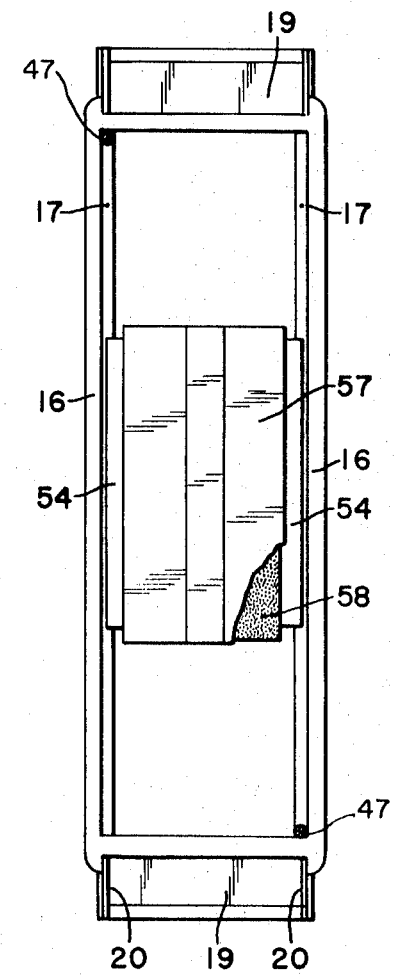

UNDERGROUND ELECTRICAL CONDUCTOR HOUSING FOR ACCOMMODATING A TRANSFORMER

BACKGROUND OF THE INVENTION

1. Field of the Invention

This invention relates to flush-mounted receptacle for electrical connections and particularly for use in the ground having an inner inverted housing for the electrical connections and, within the inner housing, provisions for accommodating a transformer and protecting it from condensation and from overheating.

2. Description of the Prior Art

In my prior U.S. Pat. No. 3,482,030, a flush-mounted receptacle is shown for the underground connection of the ends of electrical cables which provides authorized access, prevents unauthorized access and provides protection against entrance of water into the interior by the use of an inner inverted bell jar housing.

With certain of the installations to be served by the cables to be connected it is necessary to employ transformers.

The customary practice with transformers is to cover them for protection against rain, sleet and snow, and mount them in the open air or on a pole for free air circulation for cooling.

No provisions to my knowledge have heretofore been made for accommodating a transformer in a closed receptacle underground or with the top of the receptacle flush with the ground.

SUMMARY OF THE INVENTION

In accordance with the invention an underground cable connection receptacle is provided which includes an outer housing with a top closure plate which may be flush with the surface of the earth, which has an inner inverted bell housing and within the earth, which has an inner inverted bell housing and within the housing has a protective mounting for a transformer for preventing access of internal condensate to the transformer and for dissipating heat from the transformer.

It is the principal object of the present invention to provide a receptacle preferably flush-mounted in the earth, for accommodation of and protection of a transformer, and the ends of cables connected thereto.

It is a further object of the present invention to provide a receptacle of the character aforesaid which is provided with simple but effective structures for protecting the transformer.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part thereof, in which:

FIG. 2 is a top plan view of the receptacle shown in FIG. 1 with the top cover plate removed;

FIG. 3 is a top plan view of the receptacle shown in FIG. 1 with the top cover plate, the locking bar and the inner receptacle or bell, and part of the transformer protector removed;

Figure 1:
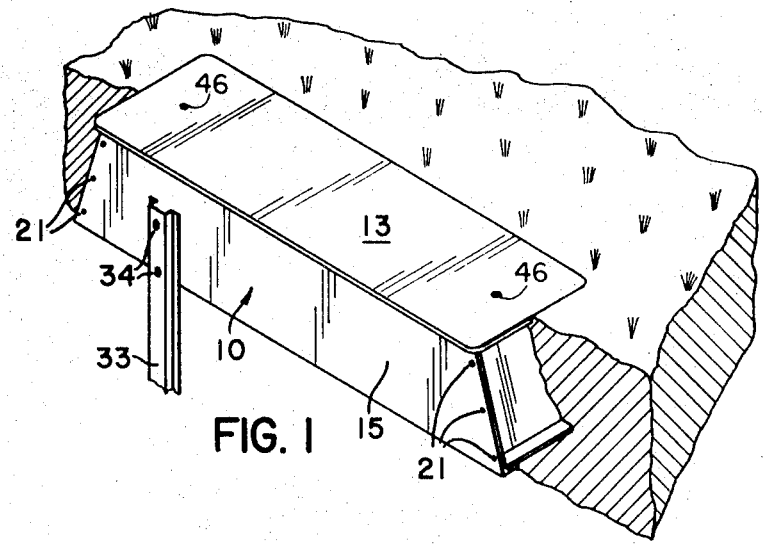
FIG. 1 is a view in perspective of the receptacle in accordance with the invention, parts being broken away to show the construction.
Figure 4:
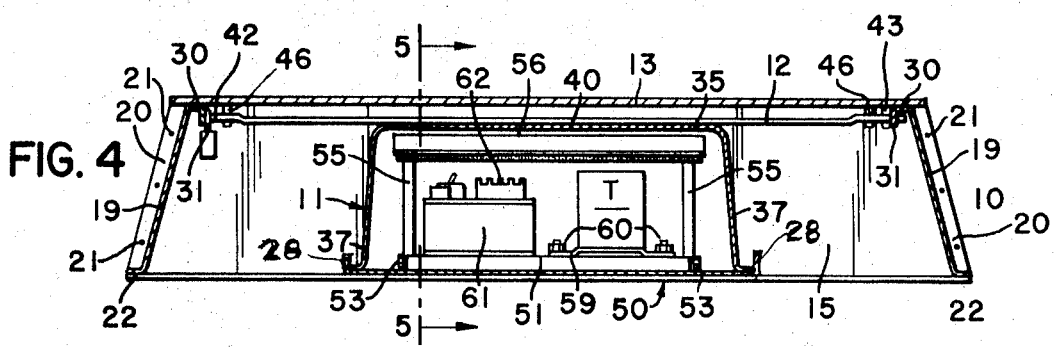
FIG. 4 is a longitudinal vertical sectional view taken approximately on the line 4—4 of FIG. 5.
Figure 5:
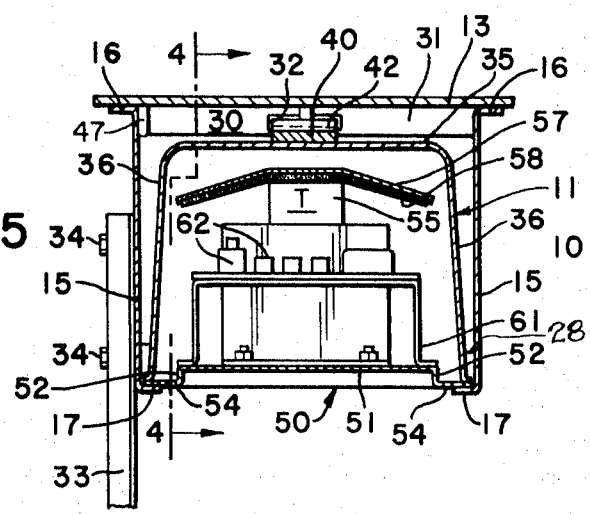
FIG. 5 is a transverse vertical sectional view, enlarged, taken approximately on the line 5—5 of FIG. 4.

It should, of course, be understood that the description and drawings herein are illustrative merely, and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings, in the preferred embodiment illustrated, an outer housing 10, inner housing 11, locking bar 12 and removable top cover plate 13 are provided.

The outer housing 10 is preferably rectangular in horizontal cross section and includes opposite vertical sidewalls 15 of generally trapezoidal shape with out-turned upper rims 16 and inturned lower rims 17.

The housing 10 has opposite inclined end walls 19 with out-turned side marginal rims 20 secured to the ends of the sidewalls 15, in any desired manner, such as by rivets 21 and bottom marginal rims 22.

The end walls 19 have locking bar-receiving brackets 30 carried thereby with vertically downwardly extending portions 31 having slots 32 for slidable movement therein of the locking bar 12.

If desired, and if holddown requirements necessitate, anchor posts 33 may be provided, secured to the sidewalls 15 such as by bolts 34.

The outer housing 10 is preferably of metal, and of a composition resistant to corrosion at the location of use, or with suitable surface coatings to prevent corrosion.

The inner housing 11 is preferably of inverted pan or bell configuration with a horizontal wall 35 and integral flared sidewalls and end walls 36 and 37. The housing 11 can be of a single piece of material, molded or drawn, and while it may be of metal, it is preferably of synthetic plastic material which is nonporous, light in weight, resistant to corrosion and if of synthetic plastic is capable of withstanding temperature changes in the range from −40° F. to 180° F.

The locking bar 12 is preferably of metal strip with an elongated central portion 40 for engagement with the exterior of the wall 35 and ends 41 and 42 offset from the plane of the central portion 40 and for slidable movement in the slots 32. The end 41 preferably has a stop or limit finger 43 extending therefrom to limit the movement of the end in its slot 32.

The end 42 has an opening 44 for the reception of a locking element which may be a small padlock or a wire with a lead seal on its ends.

The ends 41 and 42 have internally threaded holes 45 for engagement of holddown bolts 46 carried by the cover plate 13.

The cover plate 13 is relatively rigid, and can be a plate of 10 gauge or five-sixteenths of an inch thickness. The cover plate 13 is preferably provided with locating pins (not shown) extending from the lower face, and the upper face can be finished as desired, with an antifriction finish, or with identifying indicia.

The structure heretofore described is similar to that described in my U.S. Pat. No. 3,482,030, but for purposes of the present invention is longer and a particular embodiment has a length at the bottom of 50 inches.

Within the interior housing 11, for the purposes of the present invention a metallic platform 50 is provided preferably of relatively heavy sheet metal of the order of 16 gauge, with a horizontal floor 51, vertically downwardly extending sidewall portions 52 and end wall portions 53.

The sidewall portions 52 have horizontally outwardly extending flanges 54 which rest on the rims 17, in engagement therewith and on which the lower ends of the sidewalls 36 of the inner housing 11 are supported.

The end wall portions 53 serve for the mounting of metal posts 55 which carry a roof 56.

The roof 56 has an upper portion 57 of metal and a lower liner 58 of a layer of heat-insulating material such as glass fibers or stabilized foam, including polyurethane and the like.

The floor 51 has the transformer T carried thereon with the metal frame 59 of the transformer secured thereto such as by bolts 60.

The floor 51 can also carry a frame 61 thereon on which connection fittings 62 and the like can be carried for cable and transformer connections (not shown).

The mode of use will now be pointed out.

With the ends of cables in contiguous relation, the outer housing 10 is positioned in the earth with the cable ends extending upwardly thereinto and with the margins of the walls 15 and 19 at the desired location with respect to the surface of the earth dependent on whether the receptacle is to be buried, or whether flush mounting is desired.

The ends of cables are connected to and through the transformer T in any desired manner and the inner housing 11 is applied thereover. The inner housing 11 can be positioned by the transverse stop bars 28.

The end 42 of the locking bar 12 is first inserted in its slot 32, and with the central portion 40 thereof engaged on the wall 35, the end 41 is slid in its slot 32 until the stop finger 43 prevents further movement. The opening 44 is then in a position for insertion and securing of the lock which prevents unauthorized removal of the locking bar 12.

The cover plate 13, positioned by the locating pins 47 extending downwardly therefrom is then secured in place by tightening the holddown bolts 46 in engagement in the holes 45.

Water is prevented from reaching the cable ends or the connection fittings 62 or the transformer T by the bell action of the inner receptacle 11, air trapped providing a back pressure to keep the water from rising.

Any condensate which forms on the interior of the inner housing 11 will tend to run down the sidewalls and end walls 36 and 37, along the flanges 54 and into the earth below. Any condensate tending to fall from the horizontal wall 35 of the inner housing 11 will fall onto the roof 56 and be diverted outwardly and will fall onto the flanges 54 and discharge into the earth below.

Heat from the transformer T will be delivered by its frame 59 to the floor 51 from which it will pass downwardly into the wall portions 52 and end wall portions 53.

From the sidewall portions 52 heat will be transferred through the flanges 54 and the rims 17 to the sidewalls 15 and to posts 33 for dissipation into the surrounding earth.

A portion of the heat may also pass from the end wall portions 53 through the posts 55 and into the roof portion 57 which tends to heat the roof portion 57 slightly and thus inhibit condensation thereon. The liner 58 also tends to prevent cooling of the underside of the roof portion 57 and thus further reduces the tendency for condensation to occur at that location.

Authorized access to the transformer T, the connection fittings 62 and the ends of cables can be obtained by removal of the cover plate 13, the locking bar 12, and the inner housing 11. Unauthorized access is discouraged by the retention of the locking bar 12.

If flooding takes place within the outer housing 10 the inner housing 11 prevents access of water to the interior thereof because of air trapped therein, and upon removal of the cover plate 13 the water can be pumped out before the inner housing is removed for access to the cable ends, to the transformer T and the connection fittings 62.

The structure heretofore described is particularly suited for the connection of subscriber's cables to the delivery cables of CATV, and for other purposes.

I claim:

1. A receptacle for electrical equipment comprising
    an outer housing having sidewalls and end walls and an opening at the bottom,
    a removable closure for the upper part of said outer housing,
    an inner inverted fluidtight housing in said outer housing and having an internal space for the reception of electrical equipment and an open bottom portion through which conductors can extend, and
    protective equipment mounting means supported by said outer housing and disposed in said inner housing,
    said mounting means including a metal platform having portions in contact with portions of said outer housing,
    said platform having a roof carried thereabove within said inner housing.
2. A receptacle as defined in claim 1 in which
    said platform has downwardly extending wall portions and said portions in contact are flanges extending outwardly from said wall portions.
3. A receptacle as defined in claim 2 in which
    said outer housing has inwardly extending rim portions with which said flanges are in engagement.
4. A receptacle as defined in claim 1 in which
    said roof extends in covering relation to said platform.
5. A receptacle as defined in claim 1 in which
    said roof has a heat-insulating layer on the lower face thereof.
6. A receptacle as defined in claim 1 in which
    said platform has a portion for the attachment of a transformer in heat-transferring relation thereto.
7. A receptacle as defined in claim 6 in which
    said platform has another portion for mounting of connection fittings.

* * * * *